US008383076B2

(12) United States Patent
Badiei et al.

(10) Patent No.: US 8,383,076 B2
(45) Date of Patent: Feb. 26, 2013

(54) FORMATION OF SILICA COMPOSITIONS USING LOW SURFACTANT CONCENTRATIONS

(76) Inventors: Alireza Badiei, Tehran (IR); Yeganeh Khaniani, Tehran (IR); Ghodsi Mohammadi Ziarani, Tehran (IR)

( * ) Notice: Subject to any disclaimer, the term of this patent is extended or adjusted under 35 U.S.C. 154(b) by 0 days.

(21) Appl. No.: 13/034,357

(22) Filed: Feb. 24, 2011

(65) Prior Publication Data

US 2011/0150738 A1 Jun. 23, 2011

(51) Int. Cl.
*C01B 33/12* (2006.01)
(52) U.S. Cl. .................................. 423/335; 423/339
(58) Field of Classification Search .............. 423/335, 423/339
See application file for complete search history.

(56) References Cited

PUBLICATIONS

Ohkubo et al, "Synthesis of highly-ordered mesoporous silica particles using mixed cationic and anionic surfactants as templates" 2007, Journal of Colloid and Interface Science, vol. 312, pp. 42-46.*

Tsuchiya et al, "Temperature-Dependent Vesicle formation of Aqueous Solutions of Mixed Cationic and Anionic Surfactants" 2004, Langmuir vol. 20 pp. 2117-2122.*

Ogura et al, "Synthesis of Highly ordered mesoporous silica with a lamellar structure using assembly of cationic and anionic surfactant mixtures as templates" 2008, J. Phys. Chem vol. 112, pp. 12184-12187.*

Alireza et al, "Study of Silanolate Groups in Synthesis of Micelle Templated Silica with Various Conditions of Cationic Surfactant," 2008, Iran J. Chem. Chem. Eng., vol. 27, No. 1, pp. 1-6.*

* cited by examiner

*Primary Examiner* — Steven Bos
*Assistant Examiner* — Justin Bova

(57) ABSTRACT

A silica composition and a method for forming the silica composition using low surfactant concentrations are disclosed. A metal silicate precursor including a silica source and a hydroxide MOH is prepared, where M is a cation with a valence of 1. In addition, a surfactant solution including a cationic surfactant and an anionic co-surfactant is prepared. Next, the metal silicate precursor and the surfactant solution are mixed to form a mixture. Then the mixture is crystallized to form the silica composition and the silica composition is isolated. The cationic surfactant can have 10 or more carbon atoms, the anionic co-surfactant can have 4 or more carbon atoms, the molar ratio of the cationic surfactant to the silica source can be less than or equal to 0.1:1, the molar ratio of the anionic co-surfactant to the silica source can be less than or equal to 0.1:1, and the molar ratio of the anionic co-surfactant to the silica source can be less than the molar ratio of the cationic surfactant to the silica source.

15 Claims, 7 Drawing Sheets

FORMATION OF SILICA COMPOSITIONS USING LOW SURFACTANT CONCENTRATIONS

SPONSORSHIP STATEMENT

This application has been sponsored by the Iranian Nanotechnology Initiative Council and the University of Tehran, School of Chemistry, which do not have any rights in this application.

TECHNICAL FIELD

This application generally relates to silica compositions, and more particularly relates to the formation of silica compositions using low surfactant concentrations.

BACKGROUND

Lamellar structures are microstructures composed of fine, alternating layers of different materials in the form of lamellae. Lamellar silica (e.g., phyllosilica) and/or aluminosilicates are an important class of porous materials because their interlayer surfaces can be organically modified through ion-exchange, adsorption, and/or direct derivatization. These lamellar materials can also be hybridized with polymers to produce nanocomposites with properties such as, thermal and ultraviolet resistance, dimensional stability, and enhanced mechanical characteristics. However, due to the difficult dispersion behavior of the filling polymer, research on the exfoliation of the layered silica in polymers and intercalation of polymers between layered silica is increasing rapidly.

Clay minerals are hydrous aluminosilicates consisting of stable films only a few nanometers in thickness and with lateral dimensions on the order of 1 μm. Because of their anionic characteristics, cationic organic molecules can be intercalated and immobilized on the surface of clay materials. However, a drawback to this approach is the difficulty in avoiding molecular aggregation, especially in high loading conditions.

Zeolites are aluminosilicates with periodic three-dimensional frameworks having various chemical compositions. One disadvantage in their use is their limited pore size, which limits larger molecular entities from entering the voids of these materials. Zeolites are also typically negatively charged due to the replacement of $Si^{+4}$ by $Al^{+3}$ and, thus, they are not suitable for many adsorption, separation, and catalytic processes. Yet another significant disadvantage of zeolites stems from the presence of $Al^{+3}$ or other ions within their layered framework, which typically leads to aggregation of their sheets.

Researchers have synthesized lamellar MCM-50 with high surface areas, such as, for example, 1000 $m^2/g$. Lamellar MCM-50 can be crystallized in a solution of surfactants just over the critical micelle concentration ("CMC") point, defined as the concentration of surfactants above which micelles are spontaneously formed. However, the surfactants used for crystallization are relatively costly and their recovery can result in collapse of the lamellae.

Therefore, a new, more economical method for formation of silica compositions using low surfactant concentrations is necessary.

SUMMARY

A method for forming a silica composition is disclosed. A metal silicate precursor including a silica source and a hydroxide MOH is prepared, where M is a cation with a valence of 1. In addition, a surfactant solution including a cationic surfactant and an anionic co-surfactant is prepared. Next, the metal silicate precursor and the surfactant solution are mixed to form a mixture. Then, the mixture is crystallized to form the silica composition and the silica composition is isolated. The cationic surfactant can have 10 or more carbon atoms, the anionic co-surfactant can have 4 or more carbon atoms, the molar ratio of the cationic surfactant to the silica source can be less than or equal to 0.1:1, the molar ratio of the anionic co-surfactant to the silica source can be less than or equal to 0.1:1, and the molar ratio of the anionic co-surfactant to the silica source can be less than the molar ratio of the cationic surfactant to the silica source.

In some embodiments, the metal silicate precursor can be aged at a temperature of 10° C. to 30° C. for a time period of up to 24 hours. The silica source can be silicon dioxide and/or ethyl silicate. The silica source and the hydroxide can be mixed with water until a fully homogenous solution of the metal silicate precursor is prepared. The silica source and the hydroxide can be mixed at a temperature of 10° C. to 150° C. for a time period of 1 hour to 10 hours and at a pressure of 1 bar to 10 bars.

In some embodiments, the molar ratio of the silica source to the hydroxide in the metal silicate precursor can be between 1:0.5 and 1:2. In the hydroxide, M can be an alkaline metal ion, such as lithium, sodium, potassium, rubidium, and cesium, and/or an organic cation, such as quaternary ammonium cations and imidazolium salts.

In some embodiments, the cationic surfactant can be a cationic compound having 10 or more carbon atoms. The cationic surfactant can be, for example, quaternary ammonium, 1-alkyl-3-methylimidazolium halides, and/or N-alkylpyridinium halides.

In some embodiments, the anionic co-surfactant can be an aliphatic compound having 4 or more carbon atoms. The anionic co-surfactant can be an anionic hydrocarbon sulfonate, an anionic hydrocarbon carboxylate, and/or an anionic fluorine-containing sulfonate.

In some embodiments, the pH of the mixture can be between 8 and 12. The mixture can be heated to a temperature between 20° C. and 150° C. for 1 day to 10 days to crystallize the mixture. To isolate the silica composition, the silica composition can be dried at a temperature between 25° C. and 100° C. for one or more hours.

A silica composition can be formed by a process including the steps of preparing a metal silicate precursor including a silica source and a hydroxide MOH, preparing a surfactant solution including a cationic surfactant and an anionic co-surfactant, mixing the metal silicate precursor and the surfactant solution to form a mixture, crystallizing the mixture to form the silica composition, and isolating the silica composition. M can be a cation with a valence of 1, the cationic surfactant can have 10 or more carbon atoms, the anionic co-surfactant can have 4 or more carbon atoms, the molar ratio of the cationic surfactant to the silica source can be less than or equal to 0.1:1, the molar ratio of the anionic co-surfactant to the silica source can be less than or equal to 0.1:1, and the molar ratio of the anionic co-surfactant to the silica source can be less than the molar ratio of the cationic surfactant to the silica source.

Details of one or more implementations and/or embodiments of the formation of silica compositions using low surfactant concentrations are set forth in the accompanying drawings and the description below. Other aspects that can be implemented will be apparent from the description and drawings, and from the claims.

BRIEF DESCRIPTION OF DRAWINGS

Like reference symbols indicate like elements throughout the specification and drawings.

DETAILED DESCRIPTION

A method for formation of silica compositions using low surfactant concentrations is disclosed, where the molar ratio of the surfactant and co-surfactant to the silica are each less than or equal to 0.1:1, and where the molar ratio of the co-surfactant to the silica is less than the molar ratio of the surfactant to the silica. The silica compositions can have unique lamellar and/or lepispherical morphologies that depend on the particular metal silicate precursor and surfactant solution used to form the silica compositions. Moreover, any excess silica can be recovered, which, in combination with the low amount of surfactant required, results in a more economical method for forming various silica compositions.

Figure 1:
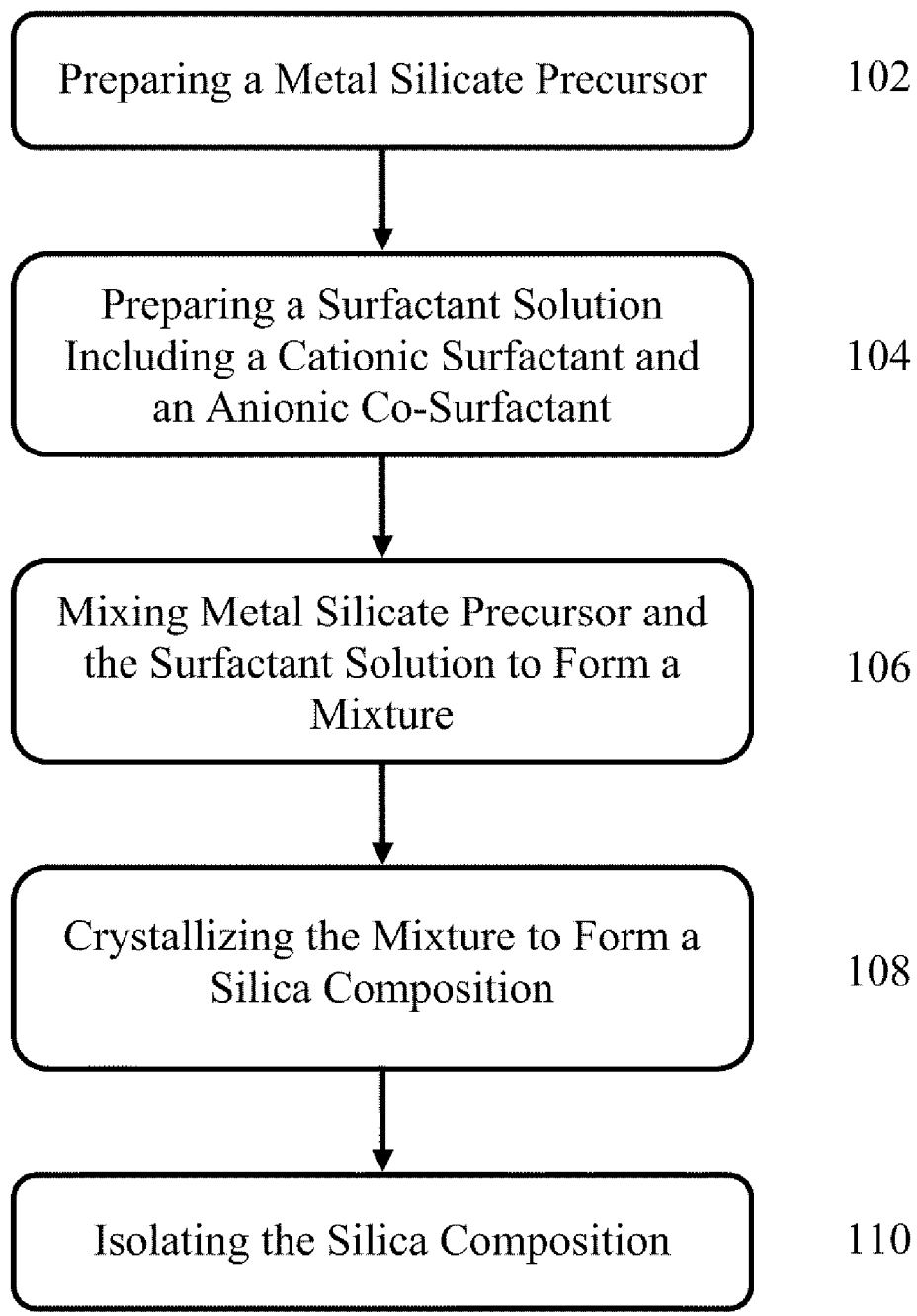
FIG. 1 illustrates an example of a method for formation of silica compositions using low surfactant concentrations.

Referring to FIG. 1, a method for the formation of silica compositions using low surfactant concentrations is illustrated. Initially, a metal silicate precursor can be prepared (step 102). The metal silicate precursor includes a silica source. The silica source can be any silica source, such as, for example, silicon dioxide ("silica"; $SiO_2$) and/or ethyl silicate ("tetraethyl orthosilicate"; "TEOS"; $(C_2H_5)_4SiO_4$).

The metal silicate precursor can also include a hydroxide, represented by MOH. The ion, M, can be a cation with a valence of 1. In some embodiments, M can be an alkaline metal ion, such as, for example, an ion of lithium ($Li^+$), sodium ($Na^+$), potassium ($K^+$), rubidium ($Rb^+$), and/or cesium ($Cs^+$). In other embodiments, the ion, M, can be any organic cation, such as, for example, quaternary ammonium cations ("quats"; $NRR_1R_2R_3$, where R can be an alkyl group or an aryl group) and/or imidazolium salts.

The silica source and the hydroxide can be mixed with water until a fully homogenous solution of the metal silicate precursor is formed. The silica source and the hydroxide can be mixed at a temperature of, for example, 10° C. to 150° C. for a time period of 1 hour to 10 hours and at a pressure of 1 bar to 10 bars. The molar ratio of the silica source to the hydroxide in the metal silicate precursor can range from 1:0.5 to 1:2 depending on the silica source and ion of the hydroxide. The molar ratio of the silica source to the water in the metal silicate precursor can range from 1:10 to 1:100, depending on the silica source.

In some embodiments, the prepared metal silicate precursor can be aged. The metal silicate precursor can be aged at, for example, a temperature between 10° C. and 30° C. for a time period of up to 24 hours.

A surfactant solution including a cationic surfactant and an anionic co-surfactant can also be prepared (step 104). The surfactant can be a cationic compound having 10 or more carbon atoms, thereby enabling the low surfactant concentrations. The surfactant can be, for example, quaternary ammonium ($NRR_1R_2R_3$), where at least one of the R groups has 10 or more carbon atoms, such as N-Cetyl-N,N,N-trimethylammonium bromide ($C_{19}H_{42}BrN$); 1-alkyl-3-methylimidazolium halides (RMImX), where X can be any halide, such as chlorine and bromide, and the alkyl group has 10 or more carbon atoms; and/or N-alkylpyridinium halides ($C_mPyX$), where X can be any halide, such as chlorine and bromide, and the alkyl group has 10 or more carbon atoms.

Whereas prior lamellar silica compositions required enough surfactant so that the molar ratio of surfactant to silica exceeded 1:1, the amount of surfactant used according to this application should be such that the molar ratio of the surfactant to the silica source is less than or equal to 0.1:1. Similarly, the amount of co-surfactant to be added can also be such that the molar ratio of the co-surfactant to the silica source is less than or equal to 0.1:1. Moreover, the molar ratio of the co-surfactant to the silica source is less than the molar ratio of the surfactant to the silica source.

In some embodiments, the co-surfactant can be an aliphatic compound having 4 or more carbon atoms. The co-surfactant can be, for example, an anionic hydrocarbon sulfonate represented by the formula $CH_3-(CH_2)_n-SO_3X$; an anionic hydrocarbon carboxylate represented by the formula $CH_3-(CH_2)_n-COOX$; and/or an anionic fluorine-containing sulfonate represented by the formula $C_4F_9SO_3X$, where n can be an integer ranging from 1 to 25 and, more preferably, an integer ranging from 6 to 17, and X is a cation having a valence of one. The cation X can be a hydrogen ion ($H^+$), an alkaline metal ion, such as, for example, an ion of lithium ($Li^+$), sodium ($Na^+$), potassium ($K^+$), rubidium ($Rb^+$), and/or cesium ($Cs^+$), or any organic cation. In some implementations, the co-surfactant can be, for example, sodium nonafluoro-1-butanesulfonate ($C_4F_9SO_3Na$) and/or sodium dodecyl sulfate ($CH_3-(CH_2)_{11}-SO_3Na$).

Although FIG. 1 illustrates that a metal silicate precursor is prepared in step 102 and that a surfactant solution is prepared in step 104, it is to be understood that the surfactant solution and metal silicate precursor can be prepared in any order, or at the same time, in the process of FIG. 1. Therefore, any order of steps 102 and 104 are within the scope of this application.

The prepared metal silicate precursor and surfactant solution can then be mixed to form a mixture (step 106). The mixture can be continuously stirred for one or more hours at a temperature of, for example, 10° C. to 100° C. and at a pressure of, for example, 1 bar to 10 bars. The mixture can have a pH between 8 and 12.

Next, the mixture can be crystallized to form a silica composition (step 108). The mixture can be crystallized, optionally, in a Teflon-lined or glass autoclave at a temperature between 20° C. and 150° C. and, preferably, 120° C. for between 1 day and 10 days.

Finally, the silica composition can be isolated (step 110). The silica composition can be isolated by filtering, rinsing, and/or drying. In some embodiments, for example, the silica composition can first be filtered, then rinsed with water, then rinsed with a solution including ethanol, and finally dried in oven at, for example, a temperature between 25° C. and 100° C. for one or more hours.

Layered Silica Composition Synthesis Example 1

Initially, 1.5 grams of the cationic surfactant N-Cetyl-N,N, N-trimethylammonium bromide ($C_{19}H_{42}BrN$) was dispersed in 75.3 milliliters of water ($H_2O$) while stirring to form a homogenous surfactant solution. Next, 0.038 grams of the co-surfactant toluene-4-sulfonic acid monohydrate ($C_7H_8O_3S$—$H_2O$) was added to the surfactant solution (step 104). This surfactant solution was continuously stirred at 30° C. for about 30 minutes.

A metal silicate precursor was prepared including silicon dioxide ($SiO_2$) and sodium hydroxide (NaOH) mixed in water ($H_2O$) (step 102). The stoichiometry of the metal silicate precursor was 0.5 moles of NaOH for every one mole of $SiO_2$ and 27.7 moles of $H_2O$ for every one mole of $SiO_2$.

Next, 40 milliliters of the metal silicate precursor was added to the homogeneous surfactant solution using a dropping funnel for 30 minutes (step 106). The mixture was continuously stirred for 1 hour at room temperature of about 20° C. to 25° C.

The mixture was then crystallized in a Teflon-lined autoclave at 120° C. for between 1 and 7 days to form a layered silica composition (step 108). Finally, the layered silica composition was filtered, rinsed with water, rinsed with a solution including equal parts water and ethanol, and dried in oven at 100° C. for 1 hour to isolate the layered silica composition (step 110).

Figure 2:
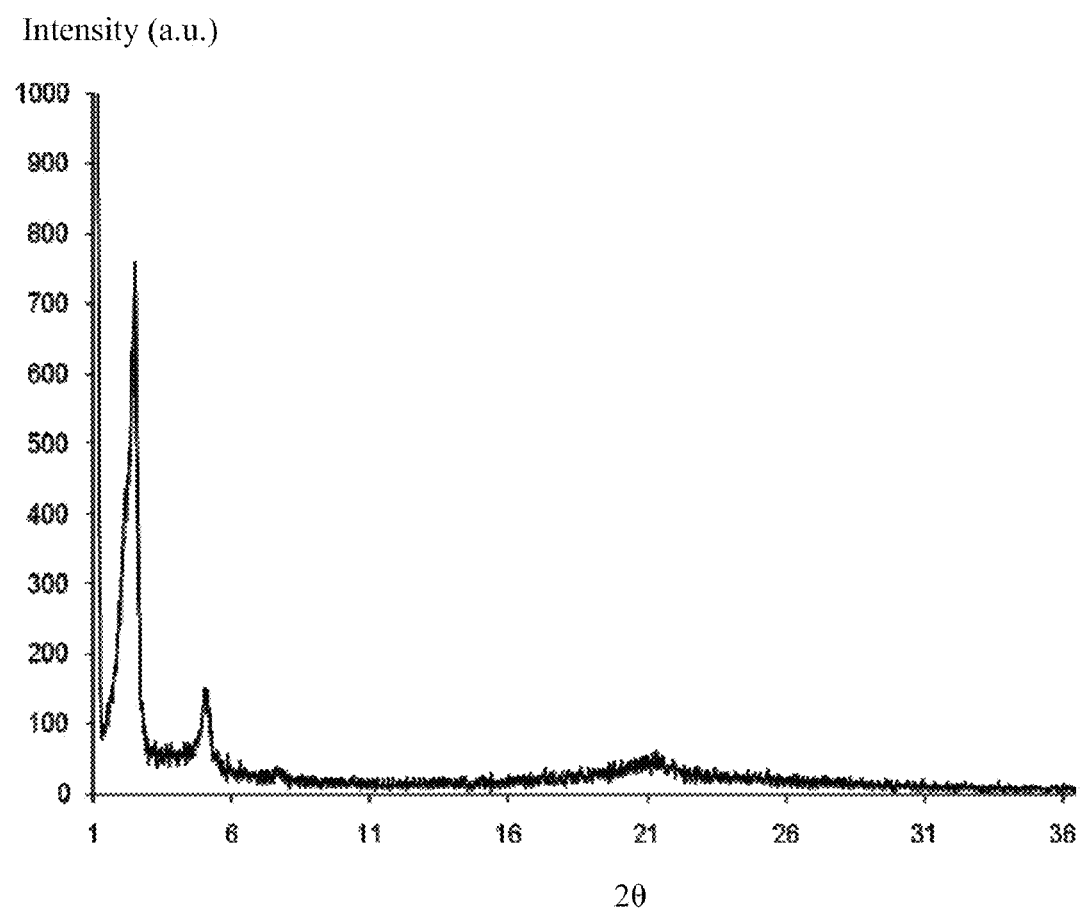
FIG. 2 illustrates an x-ray diffraction pattern of an example layered silica composition.

Referring to FIG. 2, the x-ray diffraction pattern of the layered silica composition of EXAMPLE 1 is illustrated. The diffraction peaks that occur at two-theta equaling about 2 and 4 are due to crystalline network of the layered silica composition having parallel planes at Miller indices 100 and 200. The short peak at two-theta equaling 21 is due to the amorphous silica. As such, the x-ray diffraction pattern confirms the lamellar structure of the silica composition.

Figure 3:
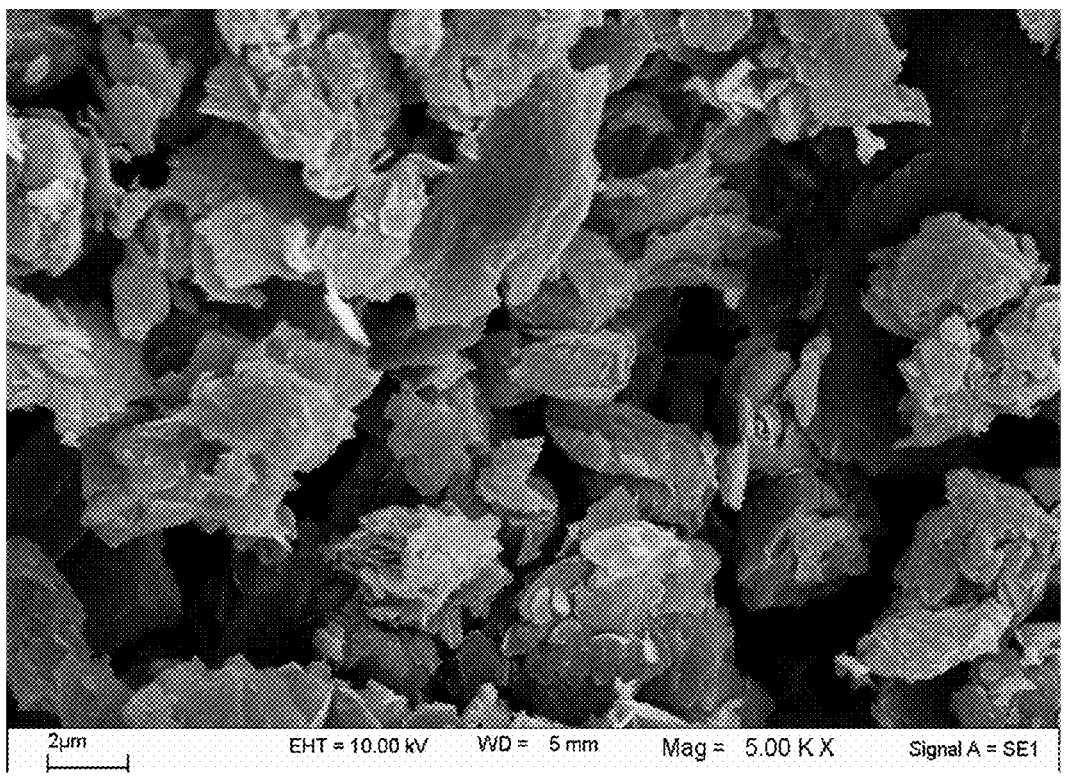
FIG. 3 illustrates a scanning electron microscopy image of the example layered silica composition at a magnification of 5000 times.

Referring to FIG. 3, a scanning electron microscopy image of the silica composition of EXAMPLE 1 at a magnification of 5000 times is illustrated. FIG. 3 clearly shows the nanolayers of the layered silica composition.

Figure 4A:
FIGS. 4a and 4b illustrate transmission electron microscopy images of example layered silica compositions, where crystallization time is 1 day and 7 days, respectively.
Figure 4B:
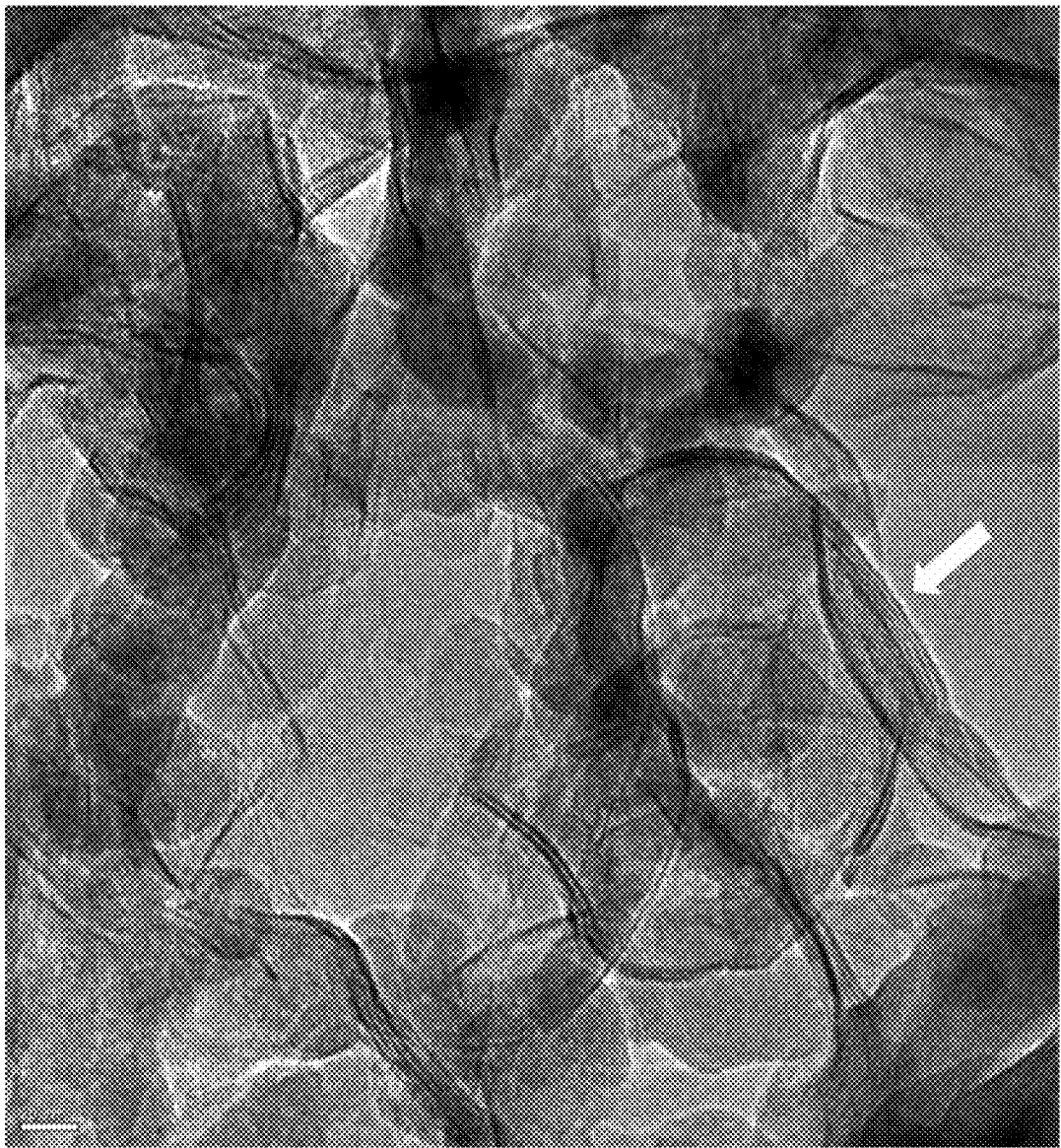

Referring to FIGS. 4a and 4b, transmission electron microscopy images of the layered silica composition of EXAMPLE 1, where the crystallization time is 1 day and 7 days, respectively, are illustrated. Arrows in FIGS. 4a and 4b highlight two overlapping thin layers, proving the lamellar morphology of the layered silica composition of EXAMPLE 1.

Lepispherical Silica Composition Synthesis Example 2

The same method as described in EXAMPLE 1 was repeated with the difference that the metal silicate precursor was prepared including silicon dioxide ($SiO_2$) as the silica source and cesium hydroxide (CsOH) as the hydroxide, rather than sodium hydroxide (NaOH) as the hydroxide.

Figure 5A:
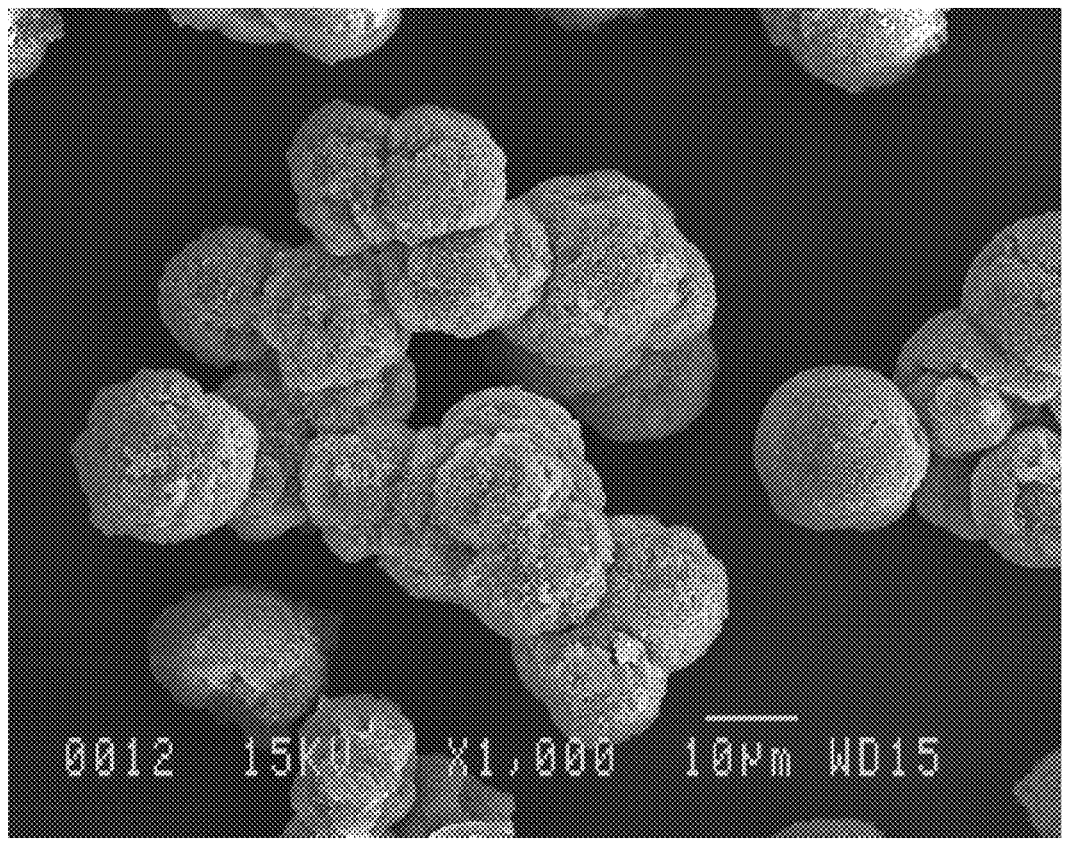
FIGS. 5a and 5b illustrate scanning electron microscopy images of an example lepispherical silica composition at a magnification of 1,000 times and 5,000 times, respectively.
Figure 5B:
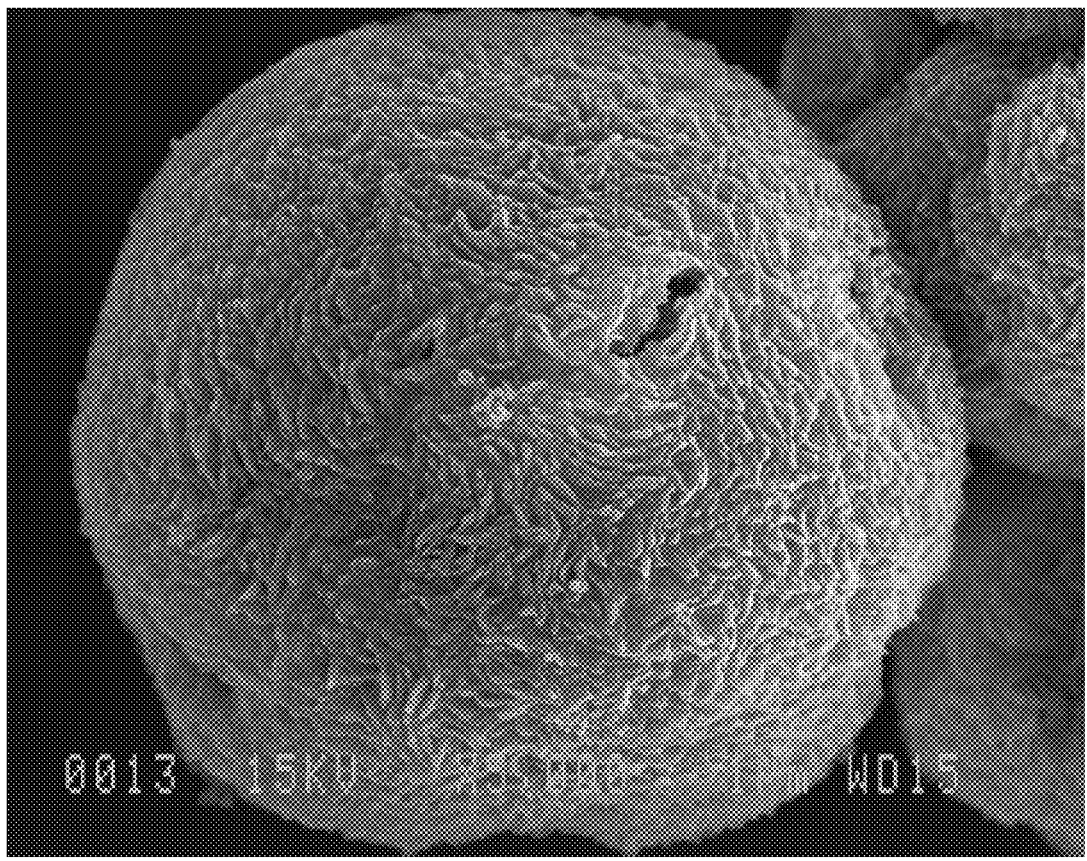

Referring to FIGS. 5a and 5b, scanning electron microscopy images of the lepispherical silica composition of EXAMPLE 2 at a magnification of 1,000 times and 5,000 times, respectively, are illustrated. FIGS. 5a and 5b clearly show that the silica composition has lepispherical morphology, rather than the lamellar structure of the silica composition formed in EXAMPLE 1.

It is to be understood the implementations are not limited to the particular processes, devices, and/or apparatus described which may, of course, vary. It is also to be understood that the terminology used herein is for the purpose of describing particular embodiments only, and is not intended to be limiting. As used in this application, the singular forms "a," "an," and "the" include plural referents unless the content clearly indicates otherwise.

Reference in the specification to "one embodiment" or "an embodiment" means that a particular feature, structure, characteristic, or function described in connection with the embodiment is included in at least one embodiment herein. The appearances of the phrase "in some embodiments" in the specification do not necessarily all refer to the same embodiment.

Accordingly, other embodiments and/or implementations are within the scope of this application.

What is claimed is:

1. A method for forming a silica composition, comprising:
preparing a metal silicate precursor, the metal silicate precursor including silicon dioxide and a hydroxide MOH;
preparing a surfactant solution, the surfactant solution including a cationic surfactant and an aliphatic anionic co-surfactant;
mixing the metal silicate precursor and the surfactant solution to form a mixture;
crystallizing the mixture to form the silica composition; and
isolating the silica composition, wherein
M is a cation with a valence of 1,
the cationic surfactant has 10 or more carbon atoms,
the aliphatic anionic co-surfactant has 4 or more carbon atoms,
the molar ratio of the cationic surfactant to the silicon dioxide is less than or equal to 0.1:1,
the molar ratio of the aliphatic anionic co-surfactant to the silicon dioxide is less than or equal to 0.1:1, and
the molar ratio of the aliphatic anionic co-surfactant to the silicon dioxide is less than the molar ratio of the cationic surfactant to the silicon dioxide.

2. The method of claim 1, further comprising aging the metal silicate precursor at a temperature of 10° C. to 30° C. for a time period of up to 24 hours.

3. The method of claim 1, wherein preparing the metal silicate precursor comprises mixing the silicon dioxide and the hydroxide MOH with water until a fully homogenous solution of the metal silicate precursor is prepared.

4. The method of claim 3, wherein mixing the silicon dioxide and the hydroxide MOH with water until the fully homogenous solution of the metal silicate precursor is prepared comprises mixing the silicon dioxide and the hydroxide MOH at a temperature of 10° C. to 150° C. for a time period of 1 hour to 10 hours and at a pressure of 1 bar to 10 bars.

5. The method of claim 1, wherein the molar ratio of the silicon dioxide to the hydroxide in the metal silicate precursor is between 1:0.5 and 1:2.

6. The method of claim 1, wherein M is an alkaline metal ion selected from the group consisting of lithium, sodium, potassium, rubidium, and cesium.

7. The method of claim 1, wherein M is an organic cation.

8. The method of claim 7, wherein the organic cation is a quaternary ammonium cation.

9. The method of claim 1, wherein the cationic surfactant is selected from the group consisting of 1-alkyl-3-methylimidazolium halides and N-alkylpyridinium halides.

10. The method of claim 1, wherein the aliphatic anionic co-surfactant is selected from the group consisting of an aliphatic anionic hydrocarbon sulfonate, an aliphatic anionic hydrocarbon carboxylate, and an aliphatic anionic fluorine-containing sulfonate.

11. The method of claim 1, wherein the pH of the mixture is between 8 and 12.

12. The method of claim 1, wherein crystallizing the mixture to form the silica composition comprises heating the mixture to a temperature between 20° C. and 150° C. for 1 day to 10 days.

13. The method of claim 1, wherein isolating the silica composition comprises drying the silica composition at a temperature between 25° C. and 100° C. for one or more hours.

14. A method for forming a silica composition, comprising:
preparing a metal silicate precursor, the metal silicate precursor including a silica source and a hydroxide MOH;
preparing a surfactant solution, the surfactant solution including a cationic surfactant selected from the group consisting of 1-alkyl-3-methylimidazolium halides and N-alkylpyridinium halides and an aliphatic anionic co-surfactant selected from the group consisting of an aliphatic anionic hydrocarbon sulfonate, an aliphatic anionic hydrocarbon carboxylate, and an aliphatic anionic fluorine-containing sulfonate;
mixing the metal silicate precursor and the surfactant solution to form a mixture;
crystallizing the mixture to form the silica composition; and
isolating the silica composition, wherein
M is a cation with a valence of 1,
the cationic surfactant has 10 or more carbon atoms,
the aliphatic anionic co-surfactant has 4 or more carbon atoms,
the molar ratio of the cationic surfactant to the silica source is less than or equal to 0.1:1,
the molar ratio of the aliphatic anionic co-surfactant to the silica source is less than or equal to 0.1:1, and
the molar ratio of the aliphatic anionic co-surfactant to the silica source is less than the molar ratio of the cationic surfactant to the silica source.

15. The method of claim 14, wherein the silica source is silicon dioxide.

* * * * *